Patented Apr. 3, 1951

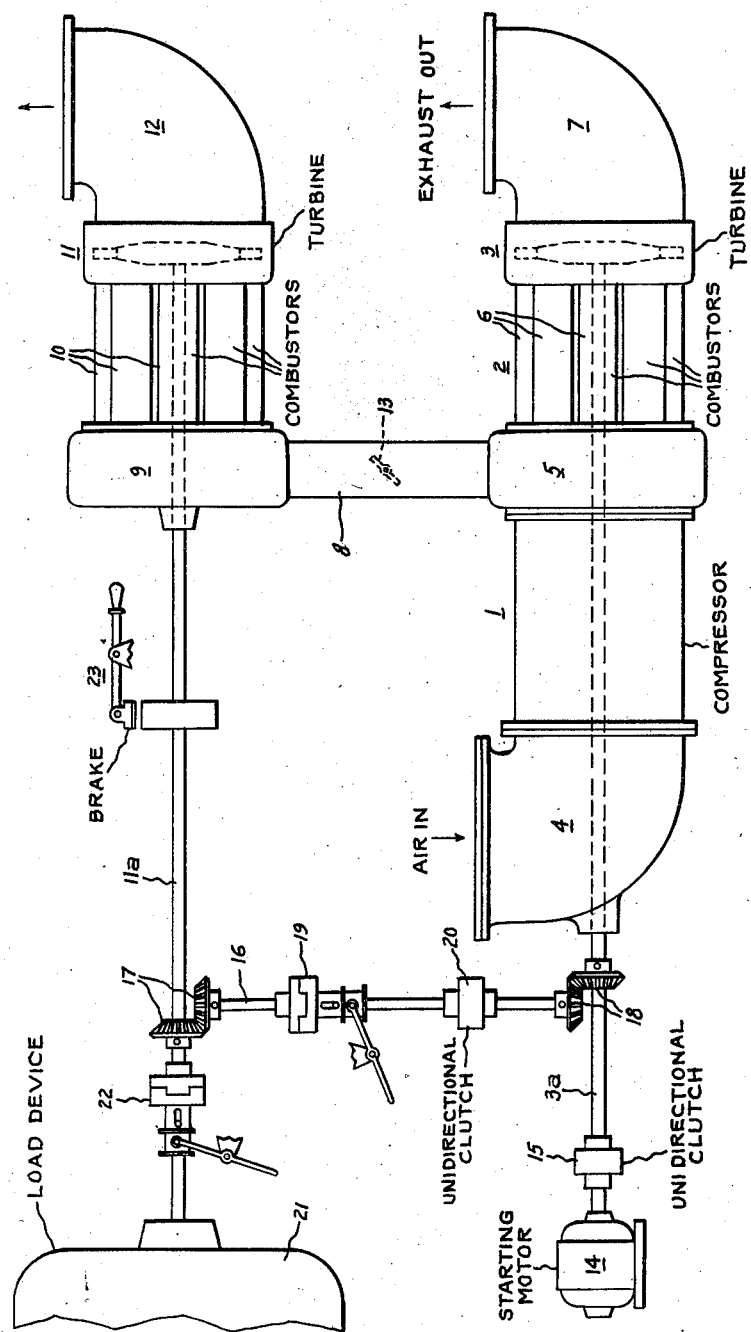
Inventor:
David C. Prince,
by Ernest C. Britton
His Attorney.

2,547,660

UNITED STATES PATENT OFFICE 2,547,660

GAS TURBINE POWER PLANT

David C. Prince, Schenectady, N. Y., assignor to General Electric Company, a corporation of New York Application October 29, 1949, Serial No. 124,411

3 Claims. (Cl. 60—41)

This invention relates to gas turbine power plants of the type having two turbine rotors, one adapted to drive a suitable load output device while the other drives the compressor which furnishes air under pressure for the combustion system. It relates particularly to an improved gas turbine power plant of the type described arranged to facilitate starting by reducing to a minimum the energy which the starting motor must supply.

Because of the fact that the open-cycle type gas turbine power plant must handle an enormous amount of air, because the turbine and compressor rotors employed have very high rotational inertia, and because of the considerable amount of power which must be developed before the cycle becomes self-supporting, it is found that starting motors of very substantial size need be employed. For instance, in a gas turbine power plant having a net output in the neighborhood of 4800 H. P., the starting motor may be required to furnish a maximum of 150 H. P. for a period of 30 seconds, the total starting cycle lasting about 2 minutes. Since the starting motor is only an auxiliary piece of apparatus used for a very small percentage of the operating time of the power plant, it is of course desired that its size and cost be reduced as much as possible.

Accordingly the object of the present invention is to provide a compound gas turbine power plant having two turbine rotors so arranged that the starting motor need supply a minimum of power in order to bring the compressor up to the idling speed (i. e. the "self-supporting, no-load" speed) of the power plant.

Other objects and advantages will be apparent from the following description taken in connection with the accompanying drawing in which the single figure is a diagrammatic representation of a compound gas turbine power plant incorporating the invention.

In the accompanying drawing, the power plant is shown as comprising a compressor 1, a first combustion system 2, and turbine 3. The compressor may be of any suitable type but is preferably of the well-known multi-stage axial flow kind, inducting air from the ambient atmosphere through an inlet casing 4 and discharging into a plenum chamber or manifold 5. Part of the air from casing 5 is supplied to one or more combustion chambers or "combustors" indicated generally at 6. These may be of any suitable kind but are preferably of the type described in the application of Anthony J. Nerad, Serial No. 750,015, filed May 23, 1947, and assigned to the same assignee as the present application. The turbine 3 is indicated diagrammatically as being of the single-stage axial flow type, and it will be understood that the turbine wheel is suitably geared to, or mounted on a common shaft with, the compressor rotor. Hot exhaust from the turbine 3 is discharged to atmosphere through the exhaust casing 7.

In accordance with the invention, another portion of the air under pressure from housing 5 is delivered through a conduit 8 to a manifold 9 supplying a second set of combustors indicated at 10. These deliver hot motive fluid to a second load turbine 11 exhausting through casing 12. As will be seen in the drawing, the turbine 11 is arranged to drive a load device 21, which may be an electric generator or any other suitable power consumer. The cross-over conduit 8 is provided with a suitable shut-off valve, such as the butterfly damper 13, which may be closed so the compressor 1 delivers all its air to the combustors 6, or may be opened so the air is divided between the combustors 6 and 10. Thus motive fluid may be supplied either to the turbine 3 alone or to both turbines 3 and 11 in parallel.

For starting purposes, a suitable motor represented by the electric motor 14 is arranged to be coupled to the turbine compressor rotor shaft. This is effected by way of a unidirectional clutch 15. This clutch is of any suitable type, such as the well-known "roller cam" or "sprag" types, and is so arranged that the starting motor may apply torque to the compressor-turbine rotor shaft; but, when the power plant begins delivering power, any attempt of the turbine-compressor shaft to supply torque back to the starting motor will result in disengagement of the unidirectional clutch 15, after which the starting motor may of course be de-energized.

Special means are provided for connecting the two turbine shafts together for purposes indicated in the method of operation outlined below. This interconnecting means includes a shaft 16 connected by suitable gears 17 at one end to the load turbine shaft 11a, while the other end is connected to the compressor turbine shaft 3a by gears 18.

The power transmission shaft 16 incorporates a positive disengaging clutch 19 of any suitable type, which may be manually operated or automatically controlled by a suitable regulating system. Shaft 16 also incorporates a unidirectional clutch, indicated at 20, which may be of the same general type as the clutch 15, and is arranged to permit the load turbine 11 to supply power to the compressor turbine shaft 3a, while preventing the flow of energy in the reverse direction. Between the load device 21 and the gears 17, the load-turbine shaft 11a is provided with a manually disconnectable clutch 22. The load turbine shaft 11a may also be provided with a suitable braking device, such as the manually operated friction brake shown at 23.

The advantages of this power plant will be seen from the following description of the method of operation.

Suppose the power plant is in the inoperative or shut-down condition, in which the load clutch 22 is disengaged, the positive clutch 19 is engaged, and the air valve 13 is closed. If now energy is supplied to the starting motor, it will begin to turn the compressor-turbine shaft 3a through the unidirectional clutch 15, while the other unidirectional clutch 20 slips, so that the gears 17 and load turbine shaft 11a remain stationary.

When the compressor rotor is operating at sufficient speed to supply air at a quantity and pressure needed to initiate flame in the combustors 6, fuel will be supplied by a suitable system of spray nozzles and ignited by a suitable ignition system (not shown). The details of the fuel supply and ignition systems are not essential to an understanding of the present invention and are therefore not disclosed herein. It may be noted however that the fuel supply system may be somewhat similar to that shown in the copending patent application Serial No. 605,960, filed July 19, 1945, in the names of M. A. Edwards, D. E. Garr, and H. M. Ogle. Since the air valve 13 is closed, the compressor 1 need supply only the air required to successfully fire the combustors 6. Since the large compressor 1, which is of course designed so as to be capable of supplying the air required by both combustion systems 6 and 10, is actually supplying all its output to the single combustion system 6, combustion may be initiated at a lower speed than would otherwise be required. Under the control of the fuel regulating system the turbine-compressor rotor is now brought up to a speed at which it begins to deliver net torque, whereupon the unidirectional clutch 15 effects disengagement of the starting motor and the latter may be de-energized. The turbine-compressor unit now operates at idling speed on a self-supporting cycle but delivers no useful net output.

If now the air valve 13 be opened gradually, air will begin flowing from the casing 5 to the manifold 9 and the second combustion system 10. Meanwhile of course the fuel regulating system increases the fuel supply to combustors 6 so as to furnish the additional energy needed by the compressor 1 in order to supply this additional air. This air flow passing through the turbine 11 may cause it to begin to rotate slowly, since the load turbine shaft 11a is disengaged from the load 21 by the clutch 22, and will deliver no torque through the unidirectional clutch 20 (even though the manual clutch 19 is now engaged) since the speed of rotation of the compressor shaft 3a is much higher than that of the slowly rotating shaft 11a. When the air flow to the combustion system 10 is adequate, fuel is supplied and combustion initiated by suitable fuel supply and ignition systems (not shown). Turbine 11 now begins to develop power and accelerates until the speed of shaft 11a becomes sufficiently great that the unidirectional clutch 20 is enabled to transmit torque to the turbine compressor shaft 3a. Thus both turbines 11 and 3 now furnish power for driving the compressor 1. Since the compressor 1 is not yet up to its full rated speed, there is a comparatively low pressure ratio across the turbines 3, 11. However, both turbines together are able to accelerate the compressor 1 to its full rated speed much more easily than one turbine acting alone could do. Once rated speed is attained, the pressure ratio across the turbine 3 becomes high enough that it alone is capable of maintaining the normal rated speed of the compressor.

Now, in order to start the load 21, the air valve 13 is closed and turbine 11 allowed to come to a standstill. This deceleration may be hastened by application of the brake 23. It will be apparent from the above description that as soon as the speed of the load output shaft 11a drops, the unidirectional clutch 20 will disengage thus permitting shafts 16, 11a to come to rest while the compressor shaft 3a continues to turn at rated speed. The load clutch 22 may now be engaged so that load 21 is positively coupled to shaft 11a. Likewise manual clutch 19 may be disengaged. During this process of stopping the load turbine 11 and coupling the load device 21, the automatic fuel supply system has of course reduced the fuel supply to combustors 6 so that the energy output of the turbine 3 is just sufficient to drive the compressor at rated speed.

Now power may be supplied to drive the load device 21 by again opening the air valve 13 and supplying fuel and air to the combustors 10. Since an axial flow turbine of the type indicated diagrammatically at 11 has inherently high torque at low speeds, it is well adapted to bring the load up to normal operating speed from standstill. It will be obvious that by suitable control of the air by adjusting the valve 13, with corresponding control of the fuel supply to the combustors 10, the turbine 11 may be caused to bring the load up to rated speed according to any desired time schedule. It will also be apparent that, the speed and power input to the load may be varied by controlling the air supply by the valve 13, with correlative control of the fuel supply, in accordance with the speed and power required by the load. The power plant is of course shut down by discontining the supply of air to the combustors 10 by closing valve 13, and then shutting off the supply of fuel to the combustors 6.

It will be seen that the arrangement described above permits the use of a comparatively small starting motor, which need be of a size only that required to cause the compressor 1 to deliver air to combustors 6 at a rate sufficient to initiate combustion therein. The compressor 1 is called upon to deliver its full output only after the turbine-compressor unit has begun to operate on a self-supporting cycle, and the starting motor has been disconnected.

It is also desired to point out that this power plant may be operated in a somewhat different manner. In this alternative method of operation, the manual clutch 19 is left engaged when the turbine 11 is started up again connected to the load 21. Now the unidirectional clutch 20 will permit the shaft 3a to run ahead of the shaft 11a. However, if at any time the speed of shaft 3a should drop substantially below the normal rated value, as for instance when the load turbine 11 is suddenly given a greater supply of fuel and air in order to rapidly accelerate the load 21, some torque may be supplied through the clutch 19 and the unidirectional clutch 20 to the compressor turbine shaft 3a. Thus the load turbine rotor may temporarily furnish power for preventing transient decreases in speed of the compressor turbine rotor. In other words, with this arrangement both turbines 11 and 3 may transiently supply power for driving the compressor 1 when the turbine 3 is temporarily unable to furnish the power required.

While it has been suggested above that any suitable automatic fuel control system may be employed, it should also be noted that the fuel supply to the combustors 6 and 10 may be controlled manually by operators who will keep the speed of the compressor shaft 3a substantially constant while the speed of output shaft 11a is caused to vary in any desired manner, as by regulating the fuel supply to combustors 10, with suitable accompanying control of air valve 13, so that the load device is driven in a desired manner. With this arrangement, the turbine-compressor unit always operates stable at rated speed and with its rated air flow, while the rotational speed and power delivered to the load device may vary over an extremely wide range from zero to full rated conditions.

It will be seen that the invention provides a versatile power plant having considerable flexibility in its method of operation, the low starting torque requirements being particularly advantageous.

While only one embodiment of the invention has been disclosed herein, it will be apparent that many substitutions of equivalents may be made; and it is desired to cover by the appended claims all such modifications as fall within the true spirit and scope of the invention.

What I claim as new and desire to secure by Letters Patent of the United States is:

1. In a gas turbine power plant of the type having a first turbine driving a compressor and a second turbine adapted to be coupled to a load device, the combination of separate first and second combustion systems for supplying hot motive fluid to the respective turbines, means for supplying air from the compressor to said separate combustion systems in parallel, shut-off valve means for stopping the flow of air to the load turbine combustion system, starting means for bringing the compressor rotor up to firing speed, load clutch means operable at will for connecting the load turbine to the load device, and power transmission means including a unidirectional clutch for transmitting torque only from the load turbine rotor to the compressor rotor, whereby the starting means may bring only the compressor rotor up to firing speed with the load clutch disengaged and said valve closed, the unidirectional clutch slipping to permit the load turbine rotor to remain at rest, after which the valve may be opened to admit air to the second combustion system so the load turbine can furnish torque through the unidirectional clutch to the compressor rotor to help bring the latter up to full rated speed, after which the valve may be closed, the load clutch engaged, and said air valve adjusted to effect development of power by the second turbine as required by the load device.

2. In a gas turbine power plant of the type having a first turbine driving a compressor and a second turbine adapted to be coupled to a load device, the combination of separate first and second combustion systems adapted to supply hot motive fluid to the respective turbines, means for supplying air from the compressor to the first combustion system, conduit means for supplying air from the compressor to the second combustion system in parallel with said first system, shut-off valve means in said conduit, starting means for bringing the compressor rotor up to firing speed, load clutch means operable at will for connecting the load turbine to the load device, and power transmission means including a unidirectional clutch for transmitting torque only from the load turbine rotor to the compressor rotor, whereby, in starting, the starting means may bring the compressor rotor up to firing speed with the load clutch disengaged and said valve closed, after which the valve may be opened to admit air to the second combustion system so the load turbine can furnish torque through said unidirectional clutch to the compressor rotor to help bring the latter up to full rated speed, after which the valve may be closed, the load turbine permitted to come to rest, the load clutch engaged, and the shut-off valve again opened so that the load turbine can deliver power to the load device.

3. In a gas turbine power plant of the type having a first turbine driving a compressor and a second turbine for driving a load device, the combination of separate first and second combustion systems adapted to supply hot motive fluid to the respective turbines, conduit means for supplying air from the compressor to the first combustion system, second conduit means for supplying air from the compressor to the second combustion system in parallel with said first system, shut-off valve means in the second conduit, a starting motor for driving the compressor rotor through first unidirectional clutch means adapted to prevent transmission of torque from said rotor back to the starting motor, second clutch means operable at will for connecting the load turbine rotor to the load device, brake means for bringing the load turbine rotor to rest, and power transmission means including third clutch means for transmitting torque only from the load turbine rotor to the compressor turbine rotor, said power transmission means including also fourth clutch means for positively preventing transmission of torque in either direction thereby, whereby, in starting, the starting motor may bring the compressor turbine rotor up to firing speed with said second clutch disengaged and said fourth clutch engaged and said valve closed, after which the valve may be opened to admit air to the second combustion system so the load turbine can furnish torque to the compressor turbine rotor to help bring the latter up to full rated speed, at which time the valve may be closed, the load turbine stopped, said second clutch engaged, and the valve again opened so that the load turbine can deliver power to the load device.

DAVID C. PRINCE.

REFERENCES CITED

The following references are of record in the file of this patent:

UNITED STATES PATENTS

| Number | Name | Date |
|---|---|---|
| 2,371,889 | Hermitte | Mar. 29, 1945 |
| 2,482,791 | Nettel et al. | Sept. 27, 1949 |